(12) United States Patent
Fildebrandt et al.

(10) Patent No.: US 7,840,935 B2
(45) Date of Patent: Nov. 23, 2010

(54) RESTRICTIVE VISUALIZATION OF A STEREOTYPE CONSTRUCT FOR ENTITIES IN A VISUAL MODELING ENVIRONMENT

(75) Inventors: Ulf Fildebrandt, Oftersheim (DE); Frank E. Seeger, Wiesloch (DE); Yuval Gilboa, Pardesiya (IL)

(73) Assignee: SAP AG, Walldorf (DE)

( * ) Notice: Subject to any disclaimer, the term of this patent is extended or adjusted under 35 U.S.C. 154(b) by 1362 days.

(21) Appl. No.: 11/323,385

(22) Filed: Dec. 29, 2005

(65) Prior Publication Data

US 2007/0168383 A1  Jul. 19, 2007

(51) Int. Cl.
*G06F 9/44* (2006.01)
(52) U.S. Cl. .................................. 717/105; 717/109
(58) Field of Classification Search .................... None
See application file for complete search history.

(56) References Cited

U.S. PATENT DOCUMENTS

| | | | |
|---|---|---|---|
| 5,446,846 | A | 8/1995 | Lennartsson |
| 6,049,822 | A | 4/2000 | Mittal |
| 6,230,309 | B1 | 5/2001 | Turner et al. |
| 6,247,174 | B1 | 6/2001 | Santhanam et al. |
| 6,407,761 | B1 | 6/2002 | Ching et al. |
| 6,429,880 | B2 | 8/2002 | Marcos et al. |
| 6,476,828 | B1 | 11/2002 | Burkett et al. |
| 6,898,794 | B2 | 5/2005 | Babutzka et al. |
| 7,028,288 | B2 * | 4/2006 | Wall et al. ............... 717/109 |
| 7,043,693 | B2 | 5/2006 | Wenzel et al. |
| 7,127,328 | B2 | 10/2006 | Ransom |
| 7,412,658 | B2 | 8/2008 | Gilboa |
| 7,463,263 | B2 | 12/2008 | Gilboa |
| 2001/0045963 | A1 | 11/2001 | Marcos et al. |
| 2002/0104068 | A1 | 8/2002 | Barrett et al. |

(Continued)

FOREIGN PATENT DOCUMENTS

WO  01/77822 A2  10/2001

OTHER PUBLICATIONS

Koch et al, "The Expressive Power of UML-based web Engineering", May 2002, Ludwig-Maximilians-University Munchen. Germany.*

(Continued)

*Primary Examiner*—Lewis A Bullock, Jr.
*Assistant Examiner*—Mark A Gooray
(74) *Attorney, Agent, or Firm*—Fountainhead Law Group P.C.

(57) ABSTRACT

Methods and apparatus, including computer program products, for stereotype constructs in a visual modeling environment. A method of generating applications includes providing a first set of modeling language entities and a predefined stereotype construct, receiving input specifying the stereotype construct as a component of an application being developed, and generating the application, where the application includes a runtime version of the stereotype construct. In that method, each entity in the first set of modeling language entities has an associated graphical representation, the stereotype construct defines an encapsulation of at least one or more modifications to a second set of one or more modeling language entities selected from the first set of modeling language entities, the stereotype construct has an associated graphical representation, and the associated graphical representation of the stereotype construct includes representations of properties of the entities in the second set of entities that are configurable by an end-user.

20 Claims, 5 Drawing Sheets

U.S. PATENT DOCUMENTS

| | | | |
|---|---|---|---|
| 2003/0202014 A1 | 10/2003 | Wood | |
| 2004/0148586 A1 | 7/2004 | Gilboa | |
| 2005/0203951 A1 | 9/2005 | Schroeder et al. | |
| 2005/0257157 A1 | 11/2005 | Gilboa et al. | |
| 2005/0261884 A1* | 11/2005 | Sakamoto et al. | 703/13 |
| 2006/0004845 A1 | 1/2006 | Kristiansen et al. | |
| 2006/0036479 A1 | 2/2006 | Whitmore | |
| 2006/0047789 A1 | 3/2006 | Kumar et al. | |
| 2006/0064667 A1 | 3/2006 | Freitas | |
| 2006/0168278 A1 | 7/2006 | Lazen et al. | |
| 2006/0206864 A1 | 9/2006 | Shenfield et al. | |
| 2006/0206890 A1 | 9/2006 | Shenfield et al. | |
| 2007/0022394 A1 | 1/2007 | Ghosh et al. | |
| 2007/0038609 A1 | 2/2007 | Wu | |
| 2007/0094609 A1 | 4/2007 | Gilboa et al. | |
| 2007/0157159 A1 | 7/2007 | Fildebrandt et al. | |
| 2007/0168383 A1 | 7/2007 | Fildebrandt et al. | |
| 2007/0168384 A1 | 7/2007 | Fildebrandt et al. | |
| 2007/0213972 A1 | 9/2007 | Schejter et al. | |
| 2007/0239717 A1 | 10/2007 | Thrash et al. | |
| 2009/0006992 A1 | 1/2009 | Gilboa | |
| 2009/0007062 A1 | 1/2009 | Gilboa | |
| 2009/0172695 A1 | 7/2009 | Lazaroff et al. | |

OTHER PUBLICATIONS

U.S. Appl. No. 12/613,250, filed Nov. 5, 2009, Gilboa.

Abrams et al., "UIML: An Appliance-Independent XML User Interface Language". Computer Networks (1999). vol. 31, No. 11-16, pp: 1695-1708.

Ceri, Stefano et al., "Web Modeling Language (WebML): A Modeling Language for Designing Web Sites," Computer Networks (2000). vol. 33, pp: 137-157.

Callahan, Evan, "Microsoft Access 2000: Visual Basic Applications Fundamentals," Microsoft Press, 1999.

Microsoft Computer Dictionary, 5th Ed., Microsoft Press, 2002.

Ayers, Larry, "A Beginner's Guide to Compiling Source Code," 1996.

Verio—"Logging into your Server from FrontPage," id=3703. 2006.

Fitzloff, Emily, Gardner, Dana, "Web Open Enterprise Portals," pl?/features/990125eiphtrm Jan. 25, 1999.

"ABAP,", Wikipedia Apr. 2007.

"RFC,", Wikipedia Mar. 2007.

"XML,", Wikipedia Mar. 2007.

"Canonical,", Dictionary.com 2000.

* cited by examiner

RESTRICTIVE VISUALIZATION OF A STEREOTYPE CONSTRUCT FOR ENTITIES IN A VISUAL MODELING ENVIRONMENT

BACKGROUND

The present disclosure relates to data processing by a digital computer in a visual modeling environment, and more particularly to a stereotype construct for entities in a visual modeling environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (LJI) is designed to work in concert with application programs, and facilitates interaction between humans and computers by inviting and responding to user input.

A structured approach to developing applications includes a model-driven tool such as SAP's Visual Composer, which is a visual modeling program. A tool like Visual Composer allows a developer to compose applications in a flexible way by using patterns. A pattern graphically depicts functional components (e.g., entities of a modeling language) as drag-and-drop services, and a data flow definition between them. User interface patterns can be defined at various levels, and can be nested within each other, thus creating hierarchies of patterns. At the top level of the hierarchy, a pattern can act as a "floor plan" for a user interface that is designed to help end-users complete a specific business process.

SUMMARY

The present disclosure provides methods and apparatus, including computer program products, that implement techniques for restricting visualization of a stereotype construct for entities in a visual modeling environment.

In one general aspect, a computer program product, tangibly embodied in an information carrier, includes instructions operable to cause data processing apparatus to provide a first set of modeling language entities and a predefined stereotype construct, receive input specifying the stereotype construct as a component of an application being developed, and generate the application, where the application includes a runtime version of the stereotype construct.

In that computer program, each entity in the first set of modeling language entities has an associated graphical representation, the stereotype construct defines an encapsulation of at least one or more modifications to a second set of one or more modeling language entities selected from the first set of modeling language entities, the stereotype construct has an associated graphical representation, and the associated graphical representation of the stereotype construct includes representations of properties of the entities in the second set of entities that are configurable by an end-user.

Implementations can include one or more of the following advantageous features. The stereotype construct can define an encapsulation of the modifications to another stereotype construct or an encapsulation of the modifications to a base entity of the modeling language. The stereotype construct can be one of a scenario, interactor, state, or service. The stereotype construct can define a modification to syntax of the second set of modeling language entities, an extension to the syntax of the second set of modeling language entities, a modification of semantics of the second set of modeling language entities, or a modification of the syntax and restriction of the semantics of the second set of modeling language entities.

Properties of the second set of entities that are fixed in the stereotype construct can be masked from presentation to an end-user of a modeling language program in the associated graphical representation of the stereotype construct.

The instructions to generate the application can include instructions to generate the runtime version of the stereotype construct at one or more generators for runtime versions of the second set of entities.

Other aspects of the subject matter described in this specification can include, a method performing tasks similar to that of the computer program product, and a system for generating an application, which includes a mechanism for receiving input specifying a stereotype construct as a component of an application being developed and a mechanism for generating the application to include a runtime version of the stereotype construct. In that system, each entity in a first set of modeling language entities has an associated graphical representation, a stereotype construct defines an encapsulation of at least one or more modifications to a second set of one or more modeling language entities selected from the first set of modeling language entities, the stereotype construct has an associated graphical representation, and the associated graphical representation of the stereotype construct includes representations of properties of the entities in the second set of entities that are configurable by an end-user.

The subject matter described in this specification can be implemented to realize one or more of the following advantages. To encapsulate one or more entities of a modeling language and modifications to those entities, a stereotype construct can be used. The stereotype construct can be an entity of the modeling language itself, with its own graphical depiction in a visual modeling program. Because the stereotype construct can encapsulate entities, properties of the underlying entities can be expressed in the stereotype construct so a user can configure those properties. To reduce visual clutter, the properties that can be configured for entities of a stereotype construct can be reduced to those properties that are configurable by an end-user; rather, than visually representing all properties of underlying entities regardless of the stereotype. Because a stereotype construct can build on existing entities, entities can be reused instead of defining an entity anew. Similarly, generating a runtime version of a stereotype can be built on mechanisms and techniques for generating a runtime version of entities modified by the stereotype. Properties and a configuration of properties can be understood by an end-user to be part a stereotype. Thus, readability and understandability of a diagram of a program in a visual modeling program can be improved.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1 is a screenshot of a user interface.

Like reference numbers and designations in the various drawings indicate like elements.

DETAILED DESCRIPTION

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Figure 2:
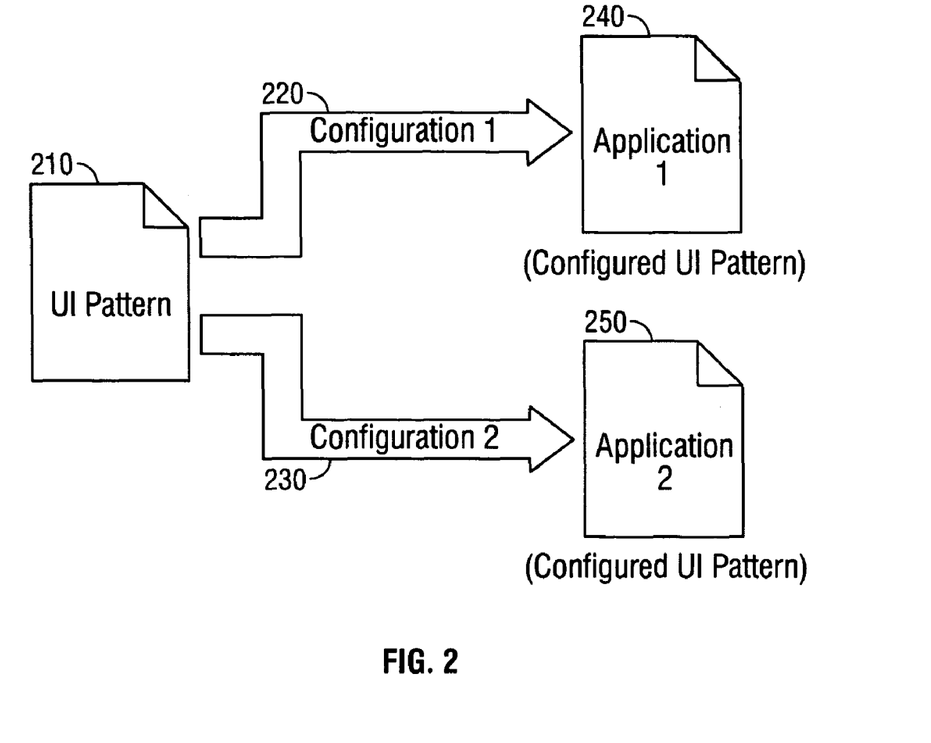
FIG. 2 is a block diagram illustrating the configuration of a UI pattern.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP, and other business logic services.

As another example of a configuration, an OiP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
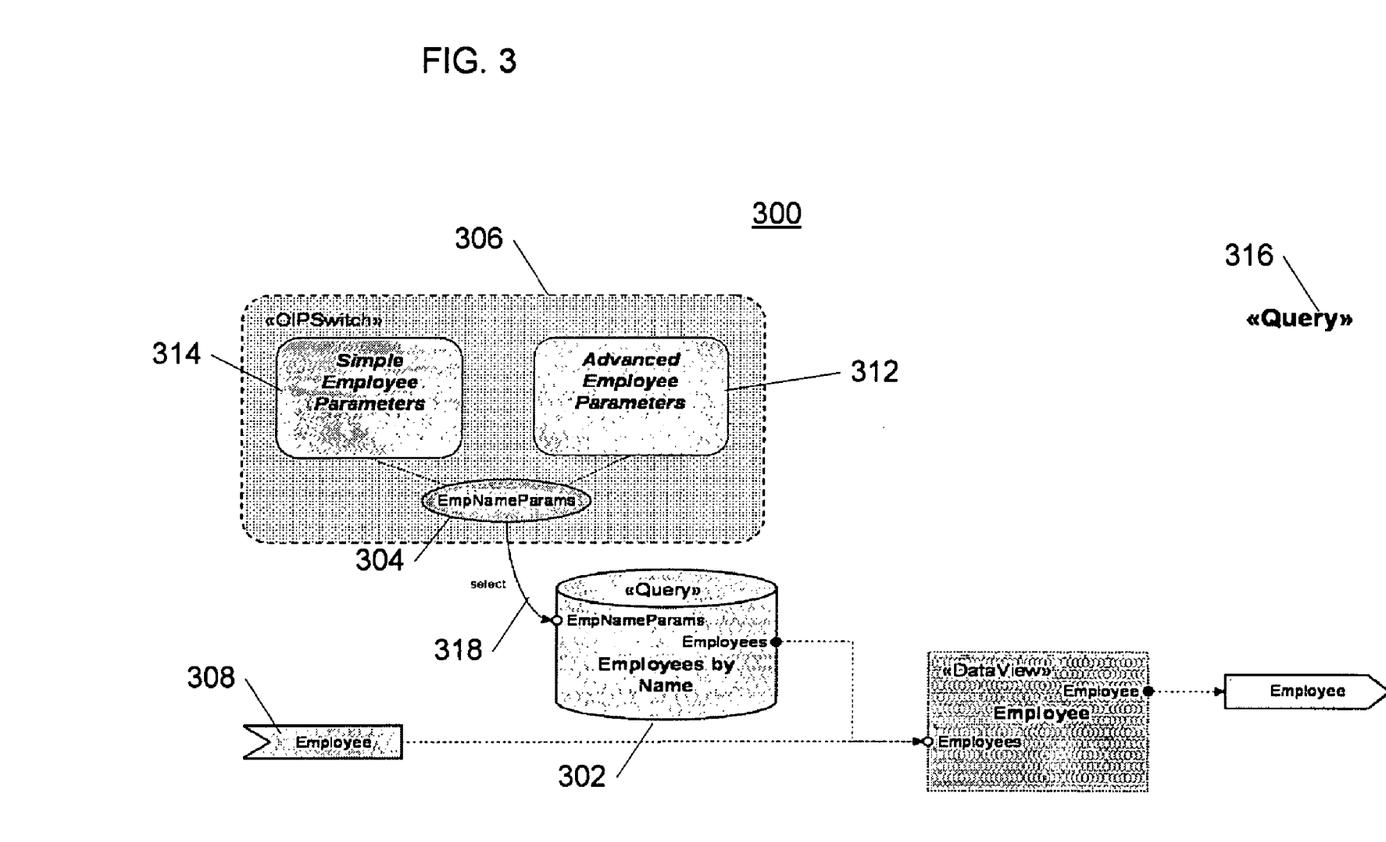
FIG. 3 is an illustration of a graphical representation of a stereotype.

FIG. 3 is an illustration of a graphical representation 300 of a stereotype. The graphical representation 300 is a graphical representation of a stereotype query scenario 316 in a visual modeling program. The visual modeling program allows users to generate applications based on a combination of patterns (graphical representations of entities in a model of an application being developed). The visual modeling program includes a base set of patterns that are provided to a user and define entities of a composition language. The composition language defines how applications can be developed in the visual modeling program. Thus, the base set of patterns can be considered building blocks for developing an application in the visual modeling program.

In the composition language, there are different types of entities that have different semantics and syntax, as represented by different types of patterns in a visual modeling program. The graphical representation 300 includes several different types of patterns, including patterns for scenarios, services, infosets, states, ports, plugs, and interactors (i.e., types of entities, including scenarios, services, etc.). Scenarios, such as the query scenario 316, are entities that represent a reusable user interface unit of an application being developed (e.g., a tab in a user interface of a web application). Services, such as the query service 302, are entities that need not have a visual representation in an end-user application (e.g., in an application developed in the visual modeling program) and provide data to other components of an end-user application. Infosets, such as the EmpNameParams infoset 304, store data and make the data available for other components of an application being developed. States, such as the OIPSwitch state 306, define visual states of a scenario by defining elements that are visible to an end-user of an application being developed (e.g., by encapsulating scenarios to be displayed). Ports, such as the Employee port 308, can be connection points to and from entities in the modeling language (e.g., a connection point between a service and an interactor). Plugs, such as the EmpNameParams plug 310, can be external representations of ports of a component (e.g., if the query service 302 were drilled down, the EmpNameParams plug 310 can be a port). Interactors, such as the Advanced Employee Parameters interactor 312, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed).

In the composition language, as reflected in a visual modeling program, the different types of entities have a different type of corresponding graphical representation. For example, interactors, such as the Advanced Employee Parameters interactor 312, have a graphical representation of a box defined by solid lines and rounded corners. As another example, a service, such as the query service 302, has a corresponding graphical representation of a cylinder.

The composition language can define certain entities. For example, the composition language can define the composition language to include the Advanced Employee Parameters interactor 312 and the Simple Employee Parameters interactor 314. Each of the entities can have different semantics and different syntax, as defined by the composition language. The entities defined by the composition language can be referred to as base entities. These entities can be understood by the visual modeling program such that the visual modeling program can generate a corresponding runtime version of the entities. For example, by having a special generator that interprets Advanced Employee Parameters interactors, a special generator can generate a runtime version of the Advanced Employee Parameters interactor 312.

To extend the composition language, without necessarily defining new base entities, a stereotype construct can be used. The stereotype construct can define different types of modifications to base entities or other stereotypes, and encapsulate those modifications. In some implementations, the stereotype construct can encapsulate a combination of one or more base entities that are modified.

As an example, in the graphical representation 300, stereotypes of an entity are represented by the "<<" and ">>" symbols, which can be referred to as guillemets or double-angle brackets. For example, OIPSwitch state 306 is an instance of the stereotype construct of an OIPSwitch state ("<<OIPSwitch>>"). In that example, the stereotype construct of an OIPSwitch state can define a state to include an interactor of type Simple Employee Parameters, an interactor of type Advanced Employee Parameters, and a infoset of type EmpNameParams. Also, the stereotype construct OIPSwitch could define the relationship among those entities. By defining a combination of entities and their relationship, the stereotype construct OIPSwitch can define syntax and semantics of the runtime version corresponding to the OIPSwitch stereotype (by defining a modification to a state entity, such as an inclusion of entities, their relationships, and their configuration).

To reduce clutter in a visual modeling program, only the properties of entities that are configurable can be displayed to a user of the visual modeling program. For example, the Simple Employee Parameters and Advance Employee Parameters interactors 312, 314 can have several properties that can be configured for each of the interactors, and the stereotype construct OIPSwitch can restrict the properties that can be configured for an instance of the stereotype construct OIPSwitch. The properties can be restricted by the stereotype by having the stereotype construct define a fixed configuration of some of the properties of the interactor entities (e.g., the underlying entities, when those entities are a part of that stereotype). To reduce visual clutter, a visual modeling program can restrict presentation (e.g., display) of the properties of the stereotype construct and the modified interactors to a display of properties that can be configured. Thus, instead of displaying all properties of a stereotype construct, only those that can be configured are displayed.

Different types of stereotype constructs can define different types of modifications to base entities. In implementations, the different types of stereotype constructs can be referred to as decorative, descriptive, restrictive, and redefining stereotypes. A decorative stereotype can define a modification to syntax of a visual modeling language, by, for example, changes to a visual notation of a designtime version of an entity (e.g., color-coding entities of certain stereotypes). A descriptive stereotype can extend syntax of a visual modeling language to express new information, by, for example, adding information to a display of a designtime version of an entity (e.g., adding a description to a pattern). A restrictive stereotype can extend syntax of a visual modeling language and impose semantic restrictions (where the restrictions do not change semantics). For example, a restrictive stereotype can define that only a subset of semantics of an entity should be part of the restrictive stereotype. A redefining stereotype can modify semantics of a visual modeling language. For example, a redefining stereotype can define a combination of base entities to make up a stereotype.

Although certain types of entities are discussed with reference to FIG. 3, additional, different, or fewer entities can be used in a visual modeling program to represent different semantics and syntax of components of an application being developed.

Figure 4:
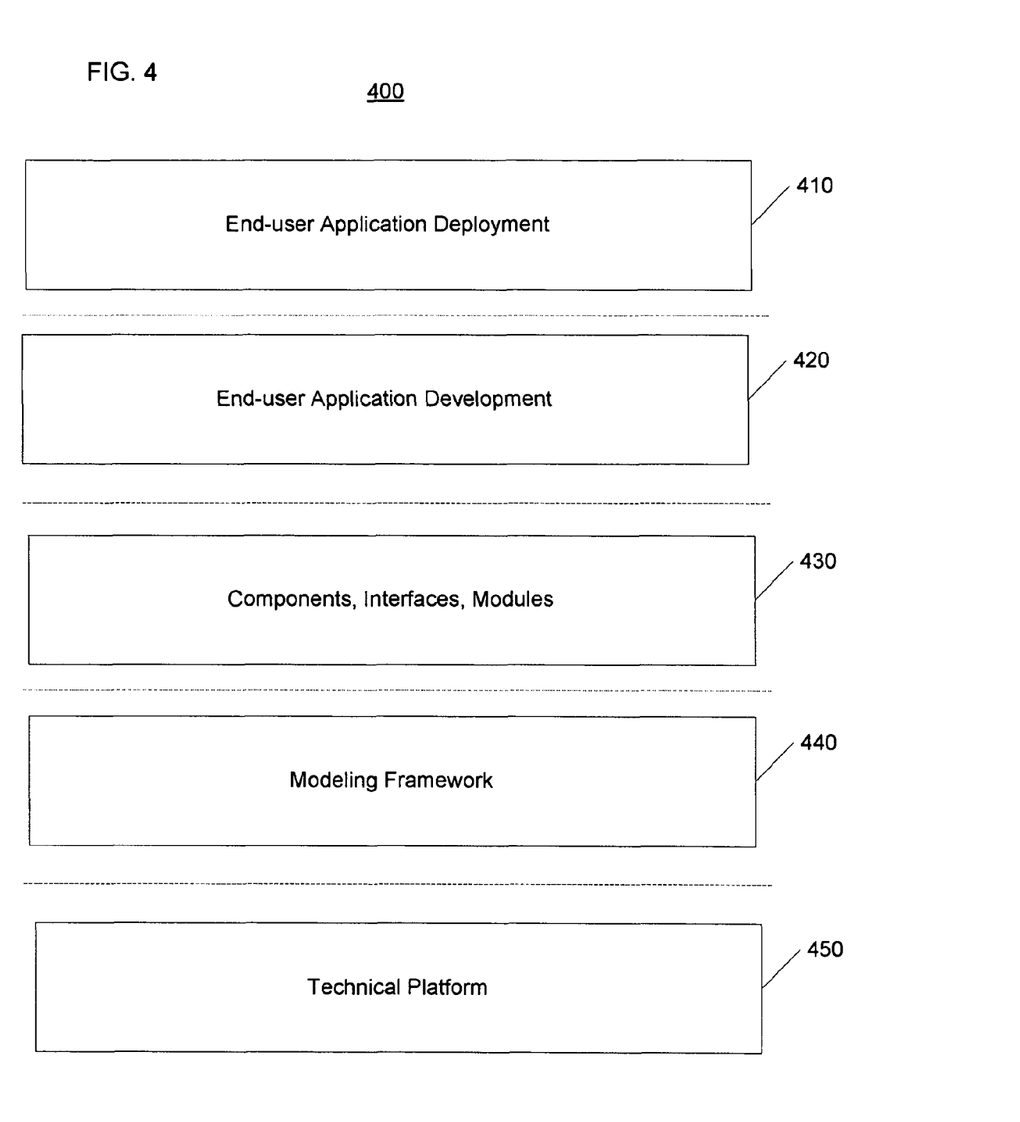
FIG. 4 is a diagram of layers of a visual modeling language environment.

FIG. 4 is a diagram of layers of a visual modeling language environment 400. The layers of the visual modeling environment include an end-user application deployment layer 410; an end-user application development layer 420; a components, interfaces, and modules layer 430; a modeling framework layer 440; and a technical platform layer 450. Each of these layers can be used and developed by a different type of user. The layers can be used to describe the different layers in which aspects of a visual modeling language environment are designed and how different types of users interact in that environment. Also, the layers can represent layers of abstraction in the visual modeling language environment.

The end-user application deployment layer 410 describes a layer in which end-users of applications developed using a visual modeling program can interact with those applications. For example, an employee of a company can interact with an application developed by a business expert who uses a visual modeling program to deploy applications for the company.

The end-user application development layer 420 describes a layer in which a visual modeling program can be used to configure and combine patterns, such as patterns describing base entities and stereotype construct entities to generate an application for end-users. For example, a business expert at a company can use a visual modeling program to generate an application for other people in the company. The patterns in the end-user application development layer 420 can be considered generic UI patterns, as each pattern defines a particular pattern (e.g., a floor plan pattern, an OIP, an ODP, a GDP, and the like), but not the specific content that is included for a specific application that uses that pattern. The specific content for a specific application can be specified by configuring the pattern.

The patterns and other components used in a visual modeling program can be defined in the components, interfaces, and modules layer 430. The patterns and other components can be defined by a component developer. For example, a software company that develops a visual modeling program or a third-party developer can develop components, interfaces, and modules in the components, interfaces, and modules layer 430. The definition of entities of the visual modeling language included in this layer can restrict how an application can be defined by an application developer (who uses a visual modeling program). If new types of entities are desired to be provided for a visual modeling program, the new types of entities can be defined in this layer as stereotype constructs. Advantageously, by defining these entities as stereotype constructs, the base set of entities need not be changed and new entities can be defined based on existing entities, which can increase reusability of components and simplify development of new entities (e.g., by reusing components that generate runtime versions of designtime entities).

The patterns and other components used in a visual modeling program are defined to interact with a technical platform layer 450 through the modeling framework layer 440. The modeling framework layer 440 defines an interface between the technically-dependent implementations of the technical platform layer 450 and entities of a modeling language. The combination of components in the modeling framework layer 440 can be referred to as a modeling framework layer as it can provide a framework for interfacing between patterns in the components, interfaces, and modules layer 430 and the technical platform in the platform layer 450. By defining this interface, the modeling framework layer can be used to define an implementation of a modeling language for a technical platform (e.g., a translation of entities of a model to runtime entities; whereas the components, interfaces, and modules layer 430 provides designtime interfaces (e.g., patterns) for the modeling language entities).

The technical platform layer 450 describes a foundation of the modeling language environment, including technically-dependent implementations of components and a platform on which applications execute. For example, the technical platform layer 450 could define runtime system components with which an application being developed in the visual modeling language environment interact. An example platform layer is the Java 2 Platform, Enterprise Edition (J2EE). The technical platform layer 450 can be used by a framework developer to developer the modeling framework layer 440.

Although a certain number and types of layers are described as being in a modeling language environment in FIG. 4, additional, different, or fewer types of layers can exist in a modeling language environment. Also, a stereotype need not be limited to being defined in the components, interfaces, and modules layer 430. In some implementations, a framework for generating a stereotype can support generation of a stereotype in the end-user application development layer 420. For example, a business experts who defines an application can also define groupings of components of an application into stereotype constructs, and use the stereotype constructs as building blocks for developing an application.

Figure 5:
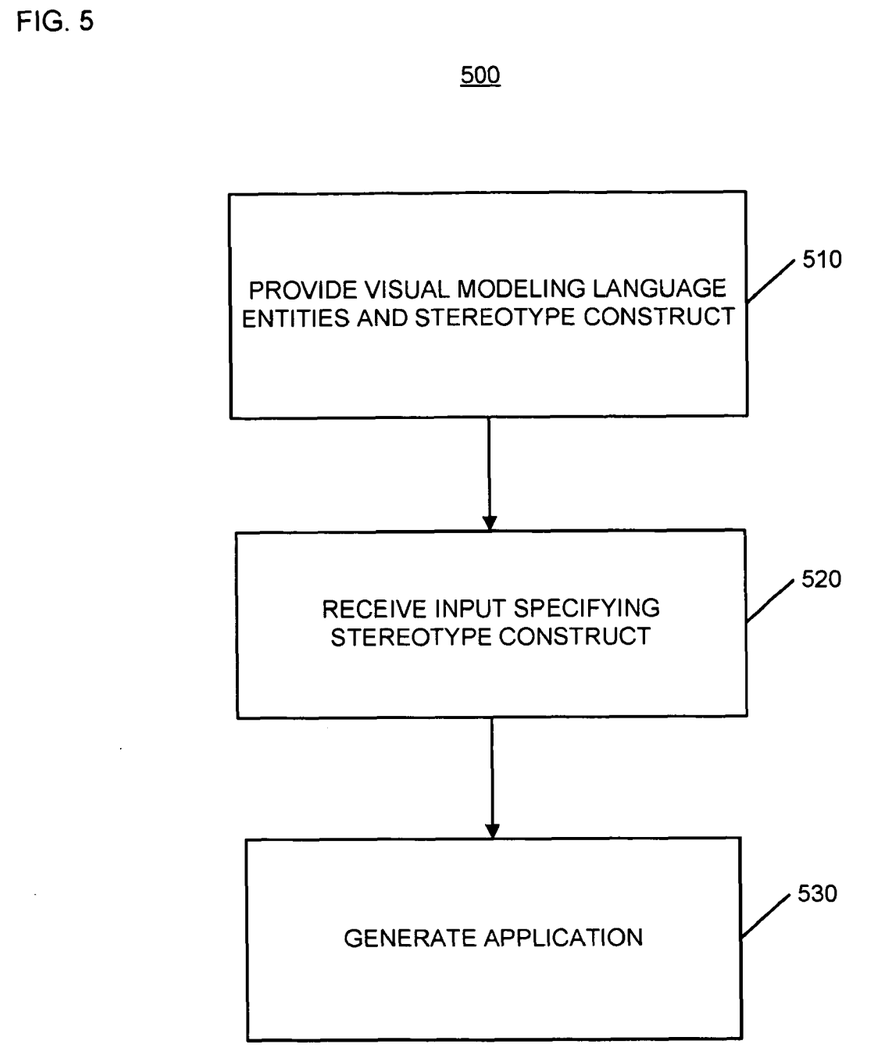
FIG. 5 is a flowchart illustrating generation of an application based on a stereotype.

FIG. 5 is a flowchart 500 illustrating generation of an application based on a stereotype. The application that is generated can be generated in a visual modeling program using a visual modeling language, such as the language discussed with reference to FIG. 3.

Visual modeling language entities and a stereotype construct are provided (510). The visual modeling language entities and the stereotype construct can be provided to a user of a visual language modeling program. The visual modeling language entities can be a base set of entities defined for a visual modeling language of a visual modeling program. Each of the visual modeling language entities has an associated graphical representation. The visual modeling language entities can also have properties and behaviors (e.g., certain semantics) that are defined for a respective entity. As an example, the Simple Employee Parameters interactor 314 of FIG. 3 has a corresponding graphical representation that indicates the entity is an interactor by virtue of having a box with solid lines and round corners, and the interactor 314 has text indicating that the interactor 314 is a Simple Employee Parameters interactor.

The stereotype construct defines an encapsulation of at least one or more modifications to one of the entities. The modification can be a modification of syntax, semantics, or both (of which, example variations are described above). For example, the modification can describe a designtime modification to a visual representation of an entity. The entities that are defined to be modified in the stereotype construct can include a base entity that is part of a modeling language or another stereotype construct. For example, in FIG. 3, the Query scenario 316 defines a modification to a scenario that includes a stereotype OIPSwitch state 306. In a representation of a stereotype construct in a modeling language underlying the graphical representations, the stereotype construct can, but need not, include entities that are in the encapsulation defined by the stereotype construct (e.g., a stereotype can refer to entities that are modified).

The stereotype construct has an associated graphical representation. For example, the stereotype OIPSwitch state 306 has an associated graphical representation as a box with dashed lines and rounded corners. The graphical representation associated with the stereotype construct includes representations of properties (of entities of the stereotype construct) that are configurable by an end-user (e.g., configurable by an end-user of a visual modeling program). For example, in the graphical representation of the OIPSwitch state 306, the select line 318 from the EmpNameParams infoset 304 can be a property of the OIPSwitch state 306 that is included in the graphical representation of the OIPSwitch state 306 and can be configured. Properties of a graphical representation of entities of a stereotype can be masked from presentation to an end-user. For example, properties of the Simple Employee Parameters interactor 314 can be masked in the stereotype OIPSwitch state 306. By presenting (e.g., displaying) properties of an entity that can be configured and masking properties that can not be configured in a stereotype, visual clutter can be reduced. Also, because stereotypes can be recognizable by an end-user of a visual modeling program (e.g., by a distinction notation for a stereotype), these properties (and a configuration of the masked properties) can be understood by an end-user to be part a stereotype. Thus, readability and understandability of a diagram of a program in a visual modeling program can be improved.

User input can be received, where the user input specifies a stereotype construct as a component of an application being developed (520). For example, a user can drag and drop a stereotype construct from a group of entities that can be used in a diagram of an application being developed to the diagram of the application. A modeling language program can associate the stereotype construct with the diagram such that a model of the application being developed includes the stereotype (e.g., a model underlying the visual representation of entities).

An application including a runtime version of the stereotype construct can be generated (530). This can be based on a determination that the stereotype construct is to be included in the application being developed (e.g., from the user input specifying the stereotype construct). Generating the runtime version of the stereotype construct can include determining entities of the stereotype construct and modifications of those entities (e.g., a configuration of properties of entities), according to the stereotype construct, and using generators of the entities of the stereotype construct to generate the runtime version. For example, for a stereotype named query service having a service entity configured to search a database using a combination of input that was preconfigured, a generator for a service entity and the configuration of that service entity according to the stereotype can be used to generate a runtime version of the stereotype construct. In addition, a configuration of the stereotype can be used to generate the runtime version of the stereotype construct. For example, in addition to a predefined configuration of entities, a stereotype can be configured by an end-user and the configuration chosen by an end-user can be used to generate a runtime version of the stereotype.

The subject matter described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including method steps, can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, operations can differ and the subject matter disclosed in this specification can still achieve desirable results. For example, although the implementations discussed above describe an all or none approach to presenting non-configurable properties of a stereotype, in some implementations some non-configurable properties can be presented. In certain implementations, multitasking and parallel processing may be preferable. Other embodiments are within the scope of the following claims

What is claimed is:

1. A computer program storage product comprising instructions operable to cause a data processing apparatus to:

provide a first set of modeling language entities and a predefined stereotype construct, wherein:

each entity in the first set of modeling language entities has an associated graphical representation, the stereotype construct defines an encapsulation of at least one or more modifications to a second set of modeling language entities selected from the first set of modeling language entities, the stereotype construct has an associated graphical representation, the associated graphical representation of the stereotype construct is configured to display representations of properties of first entities in the second set of modeling language entities that are configurable by an end-user, and the associated graphical representation of the stereotype construct is configured to mask representations of properties of second entities in the second set of modeling language entities that are unchangeable by the end-user;

receive input specifying the stereotype construct as a component of an application being developed; and generate the application, wherein the application includes a runtime version of the stereotype construct.

2. The computer program storage product of claim 1, wherein the stereotype construct defines an encapsulation of the modifications to another stereotype construct.

3. The computer program storage product of claim 1, wherein the stereotype construct defines an encapsulation of the modifications to a base entity of a modeling language.

4. The computer program storage product of claim 1, wherein the stereotype construct is one of a scenario, interactor, state, or service.

5. The computer program storage product of claim 1, wherein the stereotype construct defines a modification to syntax of the second set of modeling language entities, an extension to the syntax of the second set of modeling language entities, a modification of semantics of the second set of modeling language entities, or a modification of the syntax and restriction of the semantics of the second set of modeling language entities.

6. The computer program storage product of claim 1, wherein properties of second entities in the second set of modeling language entities that are unchangeable by the end-user in the stereotype construct are masked from presentation to the end-user of a modeling language program in the associated graphical representation of the stereotype construct.

7. The computer program storage product of claim 1, wherein the instructions to generate the application comprise instructions to generate the runtime version of the stereotype construct at one or more generators for runtime versions of the second set of modeling language entities.

8. A method of generating an application comprising:
providing a first set of modeling language entities and a predefined stereotype construct, wherein:
each entity in the first set of modeling language entities has an associated graphical representation,
the stereotype construct defines an encapsulation of at least one or more modifications to a second set of modeling language entities selected from the first set of modeling language entities,
the stereotype construct has an associated graphical representation,
the associated graphical representation of the stereotype construct is configured to display representations of properties of first entities in the second set of modeling language entities that are configurable by an end-user, and
the associated graphical representation of the stereotype construct is configured to mask representations of properties of second entities in the second set of modeling language entities that are unchangeable by the end-user;
receiving input specifying the stereotype construct as a component of the application being developed; and
generating, by a computing device, the application, wherein the application includes a runtime version of the stereotype construct.

9. The method of claim 8, wherein the stereotype construct defines an encapsulation of the modifications to another stereotype construct.

10. The method of claim 8, wherein the stereotype construct defines an encapsulation of the modifications to a base entity of a modeling language.

11. The method of claim 8, wherein the stereotype construct is one of a scenario, interactor, state, or service.

12. The method of claim 8, wherein the stereotype construct defines a modification to syntax of the second set of modeling language entities, an extension to the syntax of the second set of modeling language entities, a modification of semantics of the second set of modeling language entities, or a modification of the syntax and restriction of the semantics of the second set of modeling language entities.

13. The method of claim 8, wherein properties of second entities in the second set of modeling language entities that are unchangeable by the end-user in the stereotype construct are masked from presentation to the end-user of a modeling language program in the associated graphical representation of the stereotype construct.

14. The method of claim 8, wherein generating the application comprises generating the runtime version of the stereotype construct at one or more generators for runtime versions of the second set of modeling language entities.

15. A system for generating application comprising:
means for receiving input specifying a stereotype construct as a component of an application being developed, wherein
each entity in a first set of modeling language entities has an associated graphical representation,
a stereotype construct defines an encapsulation of at least one or more modifications to a second set of one or more modeling language entities selected from the first set of modeling language entities,
the stereotype construct has an associated graphical representation,
the associated graphical representation of the stereotype construct is configured to display representations of properties of first entities in the second set of modeling language entities that are configurable by an end-user, and
the associated graphical representation of the stereotype construct is configured to mask representations of properties of second entities in the second set of modeling language entities that are unchangeable by the end-user; and
means for generating the application to include a runtime version of the stereotype construct.

16. The system of claim 15, wherein the stereotype construct is one of a scenario, interactor, state, or service.

17. The system of claim 15, wherein the stereotype construct defines a modification to syntax of the second set of modeling language entities, an extension to the syntax of the second set of modeling language entities, a modification of semantics of the second set of modeling language entities, or a modification of the syntax and restriction of the semantics of the second set of modeling language entities.

18. The system of claim 15, wherein properties of second entities in the second set of modeling language entities that are unchangeable by the end-user in the stereotype construct are masked from presentation to the end-user of a modeling language program in the associated graphical representation of the stereotype construct.

19. The system of claim 15, wherein the means for generating the application comprises means for generating the runtime version of the stereotype construct at means for generating runtime versions of the second set of modeling language entities.

20. The computer program storage product of claim 1, wherein the properties of the second entities in the second set of modeling language entities are fixed such that the properties cannot be changed by the end-user.

* * * * *